United States Patent
Law et al.

(10) Patent No.: US 6,824,919 B2
(45) Date of Patent: Nov. 30, 2004

(54) HYBRID BATTERY HOUSING

(75) Inventors: Tong Han Law, Penang (MY); Wiling Tan, Penang (MY); Seng Hai Tan, Penang (MY); Tzer Nan Tan, Penang (MY)

(73) Assignee: Motorola, Inc., Schaumburg, IL (US)

( * ) Notice: Subject to any disclaimer, the term of this patent is extended or adjusted under 35 U.S.C. 154(b) by 227 days.

(21) Appl. No.: 10/138,614

(22) Filed: May 6, 2002

(65) Prior Publication Data

US 2003/0207171 A1 Nov. 6, 2003

(51) Int. Cl.$^7$ ............................................. H01M 2/02
(52) U.S. Cl. ..................... 429/176; 429/96; 429/100; 429/151
(58) Field of Search ........................ 429/96–100, 176, 429/151, 153, 155, 159

(56) References Cited

U.S. PATENT DOCUMENTS 4,166,157 A * 8/1979 McCormick ................ 429/174
5,552,240 A * 9/1996 Derstine ...................... 429/96
6,225,778 B1 * 5/2001 Hayama et al. ............. 320/112

FOREIGN PATENT DOCUMENTS

| JP | 55093665 A | * | 7/1980 | ............ H01M/2/02 |
| JP | 57070478 A | * | 4/1982 | ............ G04B/29/02 |
| JP | 01134850 A | * | 5/1989 | ............ H01M/2/02 |
| JP | 11176400 A | * | 7/1999 | ............ H01M/2/10 |

* cited by examiner

*Primary Examiner*—Gregg Cantelmo
(74) *Attorney, Agent, or Firm*—Philip H. Burrus, IV

(57) ABSTRACT

This invention includes a hybrid housing for rechargeable battery packs. The housing utilizes thin metal sidewalls with overlaid plastic end walls by way of an insert molding process. In a single cell, lithium-ion application, the resultant battery pack is 4.9% smaller by volume. Each sidewall up to 75% thinner than prior art sidewalls made by way of an injection molding process. The resultant battery housing is thinner and stronger than prior art housings.

12 Claims, 2 Drawing Sheets

HYBRID BATTERY HOUSING

BACKGROUND

1. Technical Field

This invention relates generally to housings for rechargeable batteries, and more particularly to very thin housings utilizing insert molding to reduce the wall thickness.

2. Background Art

Portable, battery-operated, electronic devices seem to be everywhere. From handheld games, to compact disc players, to radios, to personal data assistants, to phones, to pagers, it is becoming rare to encounter a person who does not carry at least one portable electronic device with them all the time. People carry the devices for entertainment, for organizational purposes, and for staying connected with others. A common characteristic shared by each of these devices is that they all rely on batteries for portability.

The general trend with such electronic devices is that manufacturers are making them smaller and smaller. Consequently, the batteries must be smaller as well. While some may think that a rechargeable battery is simply an electrochemical cell, commercial rechargeable batteries are actually sophisticated devices that include advanced electronic circuits. For example, a typical rechargeable battery will include a rechargeable cell, electrical contacts, a circuit board, a safety circuit, an optional charging circuit, and occasionally a fuel gauging circuit. All of these components are placed into a housing. As electronic devices get smaller, manufacturers are demanding that the batteries get smaller too.

The most common way to manufacture housings for rechargeable battery packs is injection molding. In the injection molding process, molten plastic is injected into the cavity of a metal mold. The plastic flows throughout the cavity, thereby filling it. When the plastic cools, the mold is opened and the plastic part is removed.

One problem with injection molding is that there is a fundamental limit to the minimum thickness per unit area of walls of any part. This is due to the flow of the molten plastic. If the cavity in the mold includes passages that are too thin, the plastic will not flow properly through these thin regions. Improper plastic flow leads to parts with walls that break easily or have holes in them. The net result is a battery housing with walls that fall apart too easily. The fundamental limit of battery housing wall thickness means that electronic device manufacturer's designs are limited by battery size. It would be desirable to make a thinner battery pack, thereby allowing electronic device manufacturers to further reduce the size of their devices.

There is thus a need for a battery housing having thinner walls.

DETAILED DESCRIPTION OF THE INVENTION

Figure 1:
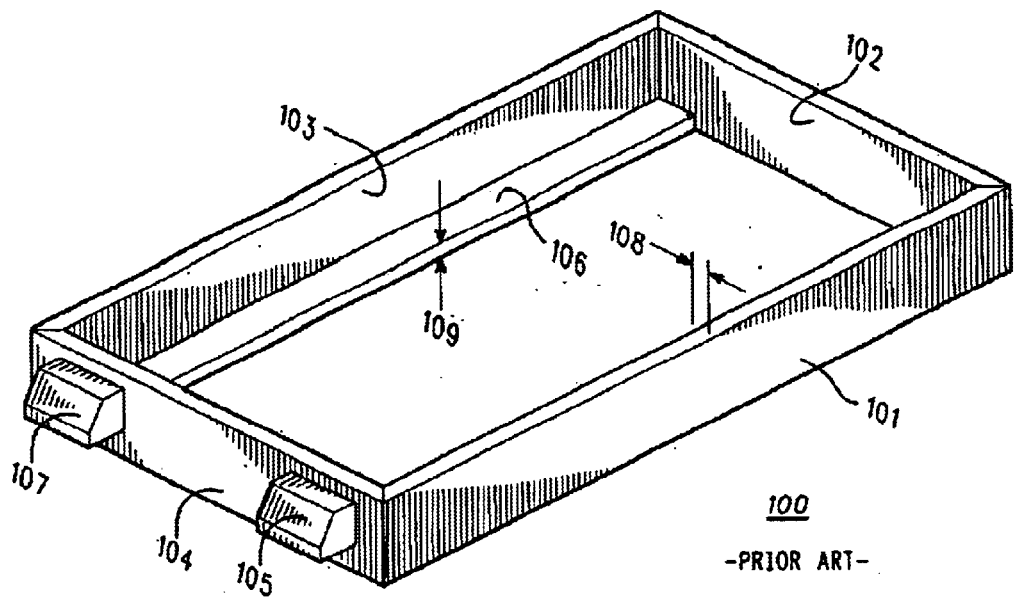
FIG. 1 is a prior art battery housing made from an injection molding process.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a prior art battery housing 100 manufactured by way of an injection molding process. This particular housing 100 would be well suited for a single-cell, lithium-ion type battery, as they are generally rectangular in shape. It is understood by those of ordinary skill in the art that injection molding allows the designer to create housings in nearly any form factor.

This particular housing 100 includes four walls 101–104 and a bottom ledge 106. The bottom ledge 106 offers a thinner final design, although the bottom ledge 106 could be replaced by a bottom member that extends from wall 101 to 103, and from 102 to 104. The drawback to adding a full bottom, however, is that the ultimate thickness must be increased in that the plastic must flow farther in the mold.

The housing 100 includes latch members 105, 107 that facilitate mechanical coupling of the battery housing 100 to the electronic device. While to latches 105, 107 are shown in this exemplary embodiment, any number and configuration of latches could be added, including latches on wall 102.

Experimental testing has shown that the fundamental minimum wall thickness, expressed by measurement 108, that can be obtained by injection molding for a standard lithium-ion cell is 0.7 mm. In addition to the fundamental minimum thickness represented by measurement 108, structural stability for the thickness of a the bottom ledge 106, represented by measurement 109, be at least 0.5 mm. Consequently, the best-case (i.e. minimum size) battery pack for single-cell, lithium-ion applications is 34.2×50×5.15 mm.

The present invention allows measurement 108 to be reduced by 75%. Additionally, measurement 109 is reduced by 60%. The invention also strengthens the walls, thereby providing a thinner, stronger battery housing. The invention employs insert molding to construct a battery housing having thin metal sidewalls and plastic end walls. The result is a battery pack that occupies nearly 5% less space by volume. This allows electronics manufacturers to make smaller products with stronger internal battery packs.

Insert molding is well known in the art. Essentially, in an insert molding process, a non-plastic member is inserted into a mold cavity prior to the injection of molten plastic. When the molten plastic is injected, the plastic flows about the non-plastic piece, thereby adhering to it. The resultant part is a plastic part having a non-plastic member embedded therein. By way of example, U.S. Pat. No. 4,249,874, issued to Reichenbach et al., incorporated herein by reference, discloses one exemplary approach.

Figure 2:
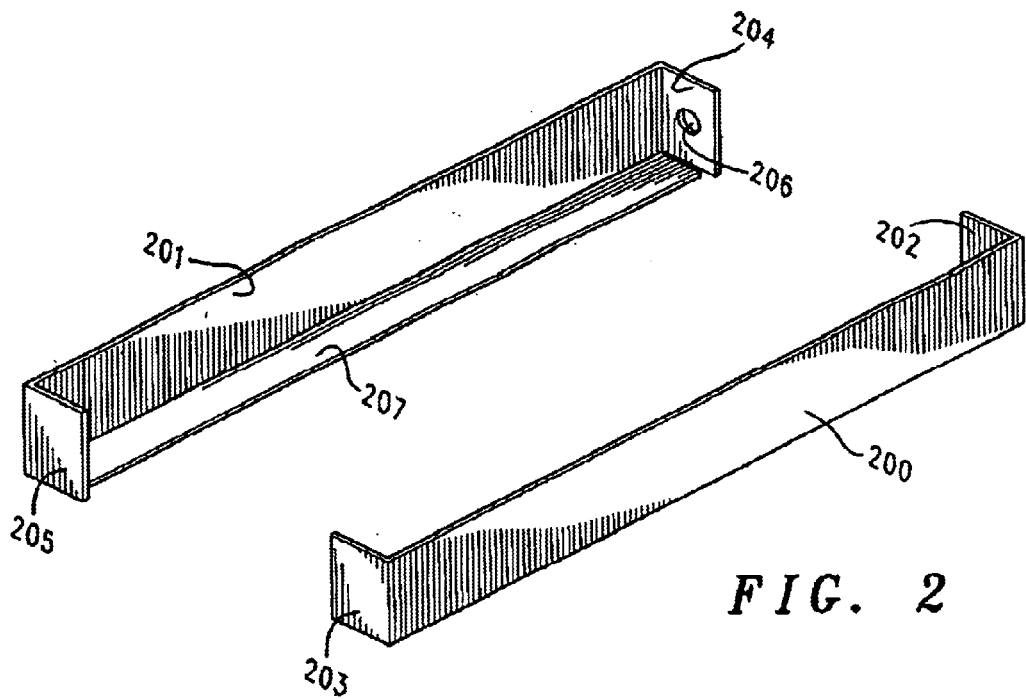
FIG. 2 is a perspective view of metal sidewalls in accordance with the invention.

Referring now to FIG. 2, illustrated therein are two exemplary sidewalls 200,201 for a battery housing in accordance with the invention. The sidewalls 200,201 are made from a thin metal, preferably stainless steel. The sidewall 200 has end tabs 202,203 about which the molten plastic will flow. Sidewall 201 has corresponding tabs 204,205. Note that at least one hole 206 may be placed in any of the tabs for better plastic adhesion.

Sidewall 207 includes a bottom ledge 207, although the sidewalls 200,201 could also be linked with a full bottom member. The sidewalls may alternatively be made without tabs. In the "non-tab" embodiment, the molten plastic would simply flow over the ends of the walls, as opposed to over tabs.

Figure 3:
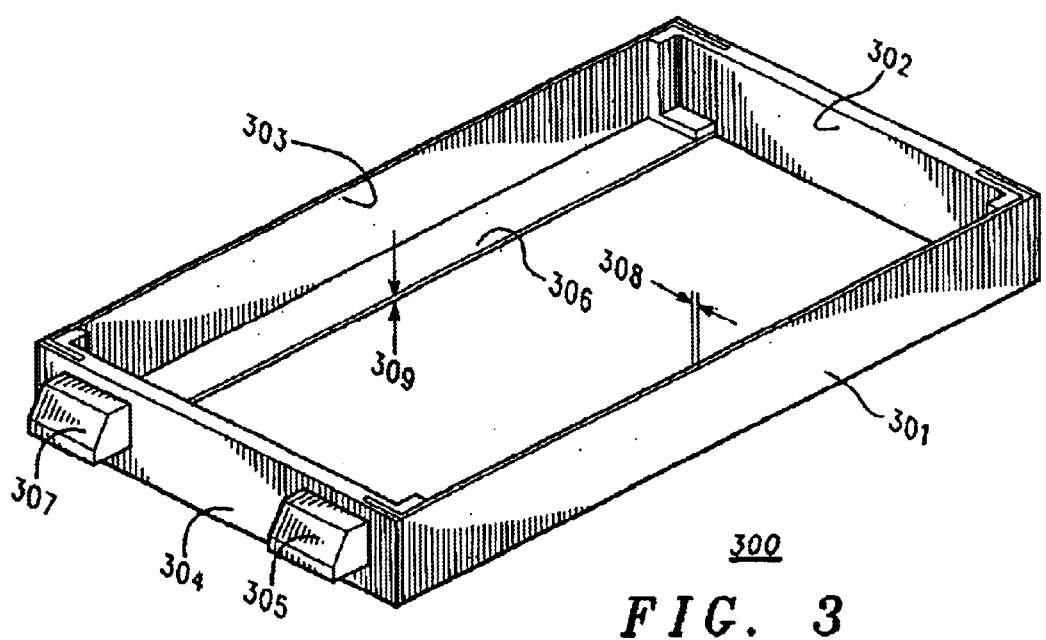
FIG. 3 is a battery housing in accordance with the invention.

Referring now to FIG. 3, illustrated therein is a hybrid battery housing 300 in accordance with the invention. In this particular embodiment, the sidewalls 301,303 are made of a thin metal like stainless steel. Sidewall 303 includes a bottom ledge 306. About the sidewalls 301,303, end walls 302,304 have been molded by way of an insert molding process. End wall 304 includes at least one latch 305,307, although end wall 302 may include latches as well. Plastic is generally used to form the end walls, although other materials capable of being molded in the injection molding process would also suffice. Preferred types of plastic include acrylonitrile butadiene styrene (ABS), polycarbonate (PC) and polycarbonate-ABS due to their durability. Other equivalents known in the art, like styrene for example, may be substituted.

Insert molding is the preferred method because the designer is able to inexpensively tool custom latches about a pair of thin and sturdy metal sidewalls. Additionally, the plastic end walls prevent electrical shorting about the cell.

In one exemplary embodiment for a single, lithium-ion cell, the wall thickness represented by measurement 308 was 0.2 mm. The thickness of the bottom ledge 306 was also 0.2 mm. The resultant hybrid housing measured 33.5×50×5 mm, a 4.9% reduction by volume over the prior art.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while battery housings for single, lithium-ion cell applications have been illustrated, it will be clear to those of ordinary skill in the art that housings for batteries having alternative form factors could also be manufactured using this process.

What is claimed is:

1. A battery housing, comprising:
   a. at least one metal member; and
   b. at least one molded member manufactured from plastic; wherein the at least one molded member and the at least one metal member are mechanically coupled by way of an insert molding process, wherein the at least one metal member comprises at least one end tab, wherein the at least one end tab comprises at least one aperture.

2. The housing of claim 1, wherein the at least one metal member further comprises at least one bottom ledge.

3. The housing of claim 2, wherein the at least one molded member is manufactured from plastic selected from the group consisting of ABS, polycarbonate, styrene and polycarbonate-ABS.

4. The housing of claim 3, wherein the at least one molded member further comprises at least one means for coupling to an electronic device.

5. The housing of claim 1, wherein the housing comprises at least four walls.

6. The housing of claim 5, wherein a first of the at least four walls is the at least one metal member, and a second of the at least four walls is the at least one molded member.

7. The housing of claim 1, wherein the at least one metal member is less than 0.5 mm thick.

8. The housing of claim 7, wherein the at least one metal member is manufactured from stainless steel.

9. The housing of claim 8, wherein a third of the at least four walls comprises a second metal member.

10. The housing of claim 9, wherein the fourth of the at least four walls comprises a second molded member.

11. A rechargeable battery, comprising:
    a. at least one rechargeable cell; and
    b. the battery housing of claim 1.

12. The battery of claim 11, wherein the at least one rechargeable cell is selected from the group consisting of nickel-cadmium cells, nickel-metal-hydride cells, lithium-ion cells and lithium polymer cells.

* * * * *